United States Patent [19]

Jacobson

[11] Patent Number: 4,530,813
[45] Date of Patent: Jul. 23, 1985

[54] MODULAR REACTOR HEAD SHIELDING SYSTEM

[76] Inventor: Earl B. Jacobson, 510 S. Shore Dr., Crystal Lake, Ill. 60014

[21] Appl. No.: 435,061

[22] Filed: Oct. 18, 1982

Related U.S. Application Data

[63] Continuation-in-part of Ser. No. 207,183, Nov. 10, 1980, Pat. No. 4,432,932.

[51] Int. Cl.³ .......................... G21F 3/00; G21F 5/00
[52] U.S. Cl. .................................. 376/287; 376/260; 250/515.1; 250/519.1
[58] Field of Search ............... 376/287, 260, 262, 249; 250/506.1, 519.1, 515.1, 517.1, 518.1

[56] References Cited

U.S. PATENT DOCUMENTS

| | | | |
|---|---|---|---|
| 2,718,598 | 9/1955 | Graf | 250/519 |
| 3,090,740 | 5/1963 | Huston et al. | 376/260 |
| 3,239,669 | 3/1966 | Weinberger | 250/519 |
| 3,960,242 | 6/1976 | Saxonmeyer | 376/260 |
| 4,062,518 | 12/1977 | Stivender et al. | 250/519 |
| 4,071,404 | 1/1978 | Aoki | 376/287 |
| 4,090,087 | 5/1978 | Weissenfluh | 250/519 |
| 4,123,662 | 10/1978 | Fisher | 376/287 |
| 4,126,515 | 11/1978 | Klotz et al. | 376/287 |
| 4,196,049 | 4/1980 | Burns et al. | 376/249 |
| 4,199,857 | 4/1980 | Meuschke et al. | 376/260 |
| 4,223,575 | 9/1980 | Krueger | 376/260 |
| 4,272,321 | 6/1981 | Betancourt et al. | 376/262 |
| 4,299,658 | 11/1981 | Meuschke et al. | 376/260 |

FOREIGN PATENT DOCUMENTS

| | | | |
|---|---|---|---|
| 2423578 | 11/1979 | France | 376/260 |
| 944500 | 12/1963 | United Kingdom | 376/287 |

Primary Examiner—Harvey E. Behrend
Attorney, Agent, or Firm—Winburn & Gray, Ltd.

[57] ABSTRACT

An improved modular reactor head shielding system is provided that includes a frame which is removably assembled on a reactor head such that no structural or mechanical alteration of the head is required.

The shielding system also includes hanging assemblies to mount flexible shielding pads on trolleys which can be moved along the frame. The assemblies allow individual pivoting movement of the pads. The pivoting movement along with the movement allowed by the trolleys provides ease of access to any point on the reactor head. The assemblies also facilitate safe and efficient mounting of the pads directly to and from storage containers such that workers have additional shielding throughout virtually the entire installation and removal process.

The flexible shielding pads are designed to interleave with one another when assembled around the reactor head for substantially improved containment of radiation leakage.

18 Claims, 17 Drawing Figures

MODULAR REACTOR HEAD SHIELDING SYSTEM

RELATED APPLICATIONS

This application is a continuation-in-part of U.S. Ser. No. 207,183, filed Nov. 10, 1980, now U.S. Pat. No. 4,432,932, which is assigned to the same assignee as this application and is incorporated herein by reference.

BACKGROUND OF THE INVENTION

The invention relates generally to radiation shielding systems and more particularly to a modular type reactor head shielding system designed to be temporarily assembled around a reactor head such as during refueling operations. The system employs a frame or track around the periphery of the reactor head to which shielding pads can be quickly and easily attached while providing maximum protection to workmen.

In nuclear power plants, the reactor heads are removed during refueling operations. The reactor head typically is situated in a concrete type well and is removed from the well during the refueling operation. During these operations it would be desirable to have the reactor head shielded so that workers are not exposed to radiation from the reactor head.

Each worker typically is attired in radiation protective clothing; however, each reactor head typically is secured by a large number of stud bolts around the top of the reactor which must be removed resulting in exposure to the workers.

Attempts to reduce this exposure have been made such as by hanging or placing lead shielding such as individual bags, around the reactor head. These non-integrated systems have several disadvantages including exposure between the single layer of bags, no system to secure the bags to the reactor head and possible damage to the reactor head by the jury rigged systems.

With the prior art shielding systems it was also not desirable to hang the bags around the reactor head on a frame or other means since it would be preferable to move the shielding with the reactor head when it is removed to refuel the reactor. Further, the work space or well in which the reactor head is situated does not allow a large amount of clearance between the workers, the well wall and the reactor head.

Finally, with the prior art systems there is the problem of gaining access to any particular point on the reactor head while the system is in place. Any work on the reactor head required a complete disassembly of at least a portion of the shielding system and removal of the shielding from that area.

SUMMARY OF THE INVENTION

The above and other disadvantages of prior art reactor head shielding techniques are overcome in accordance with the present invention by providing a modular reactor head shielding system which includes a frame or track which is assembled on the reactor head without any drilling, welding or disassembly.

A plurality of flexible shielding pads, which are shaped to interleave with one another when assembled around the reactor head, are suspended by hanging assemblies from trolleys which roll on the frame around the reactor head. This arrangement allows the pads to be moved around the head as well as pivoted on their own axes to allow access to any point on the reactor head while still shielding the rest of the reactor head.

Each hanging assembly preferably is constructed to hang a pair of pads therefrom. The assembly also facilitates the simultaneous and direct mounting from storage containers onto the frame and removal therefrom. The modular system results in faster and easier mounting and removal of the shielding. The system also decreases radiation exposure during operation as well as during mounting and removal.

DESCRIPTION OF THE PREFERRED EMBODIMENTS

FIGS. 1-7 are illustrative of embodiments first disclosed in the parent application, U.S. Ser. No. 207,183.

Figure 1:
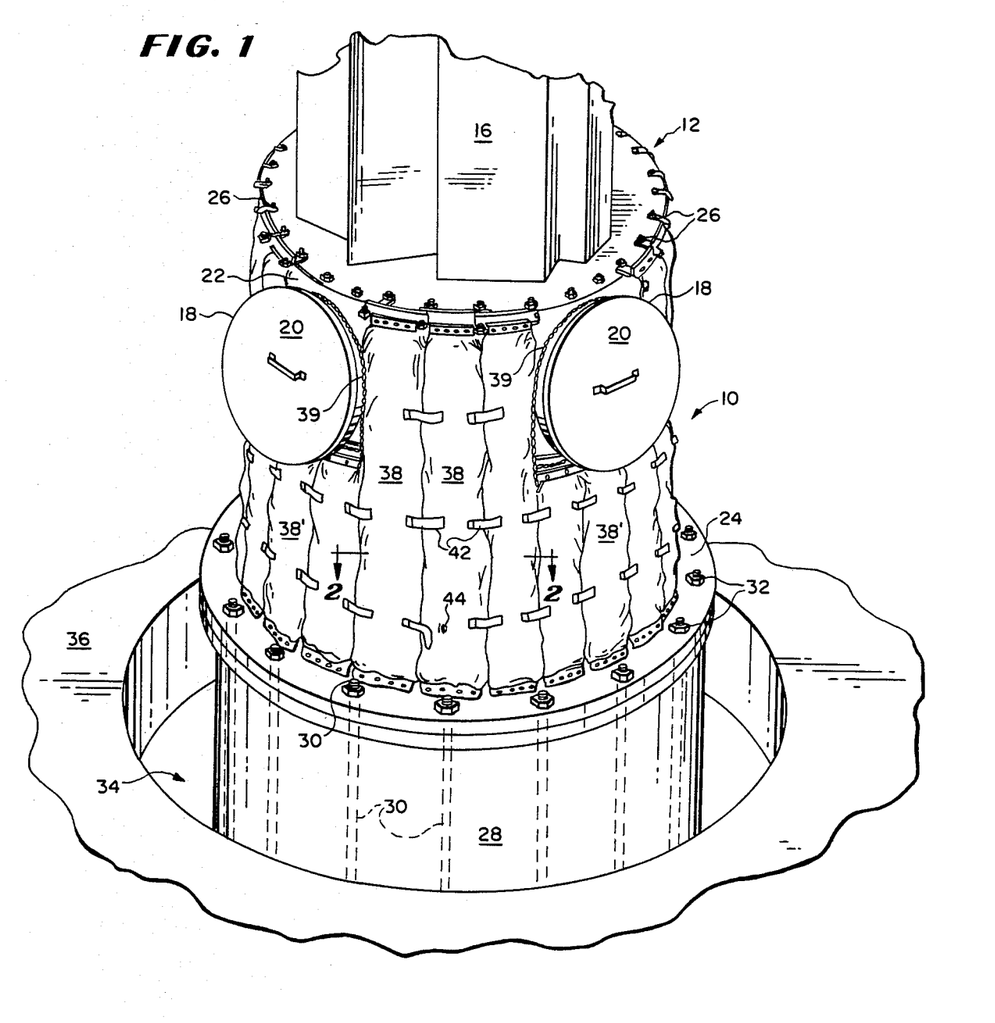
FIG. 1 is a partial perspective view of a reactor head with the modular reactor head shielding system of the invention of the parent application assembled thereon.

Referring to FIG. 1, a modular reactor head shielding system embodying the invention of the parent application, is designated generally by the reference number 10. The modular reactor head shielding system or reactor shield 10 is shown operatively in place mounted on a reactor head 12. The reactor head 12 includes a top 14 from which extends control rods or a control rod cover 16. The reactor head 12 includes a plurality of vent ports 18 each of which is shown with a cover plate 20 of the reaction shield 10.

The reactor head 12 includes a generally cylindrical side 22 from which extends the vent ports 18 and which may have various shapes depending upon the manufacturer of the reactor head and may be tapered from the top 14 down to a bottom flange 24 which forms the bottom of the reactor head cover. The top 14 is typically secured to the side 22 by a plurality of bolts 26.

The reactor head 12 is secured to a reactor base 28 by a plurality of studs 30 onto which are mounted nuts 32. The reactor base 28 typically is situated in a well 34 which may include a shoulder 36 as illustrated or may be substantially upstanding around the whole reactor head 12. The nuts 32 can be removed with the shield 10 in place.

The reactor shield 10 includes a plurality of pads 38 which are hung by mounting plates 40 from the reactor top 14 such as from the bolts 26. Shorter pads 38' are hung below the vents 20 by chains or straps 39. The pads 38 and 38' interleave with one another such that there are no radiation paths between adjacent pads. The pads are secured to one another by straps 42 which adhere to mating pieces 44 on the adjacent pads 38 when pressed together (such as that sold under the trademark "Velcro").

Figure 2:
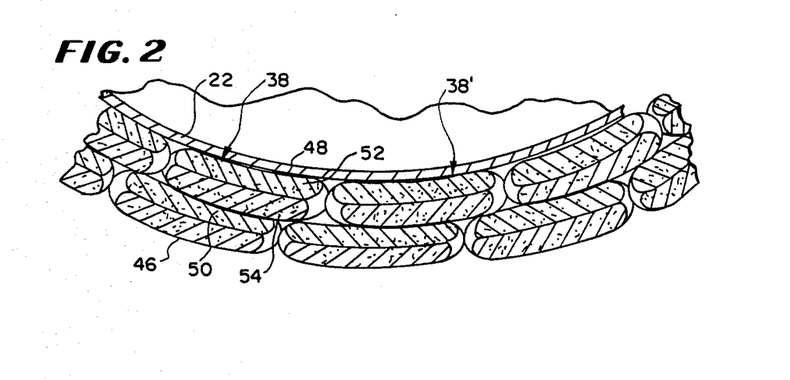
FIG. 2 is a top sectional view of a portion of the shielding system of FIG. 1 taken along the line 2—2 therein.

The interleaving or overlap of the pads 38 and 38' is best illustrated in FIG. 2. Each of the pads 38 or 38' includes a pair of outer covers or sleeves 46 and 48 which are secured together offset from one another at a seam 50. Each sleeve 46 or 48 includes a pair of blankets 52 and 54. The manufacture of the blankets 52 and 54 and pads 38 and 38' is best described with reference to FIGS. 3 and 4.

Figure 3:
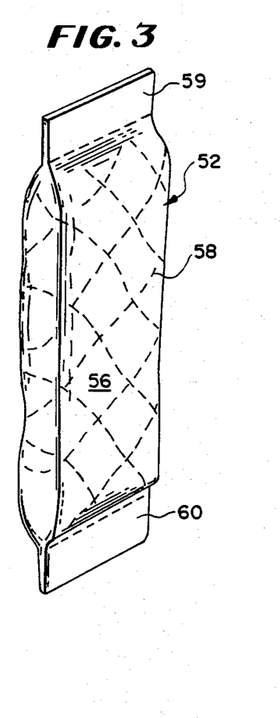
FIG. 3 is a perspective view of one blanket utilized in the shielding system.

One blanket 52 is illustrated in FIG. 3. The blanket 52 includes a cover 56, such as nylon which can be plastic coated to prevent the lead from oxidizing. The cover 56 is filled with lead wool, as for example with 10 pounds per square foot. The cover 56 is then stitched with a grid type pattern 58 to secure the lead wool so that it does not shift within the blanket 52. The blanket 52 is sealed at its top and bottom ends 59 and 60 such as by sewing.

Figure 4:
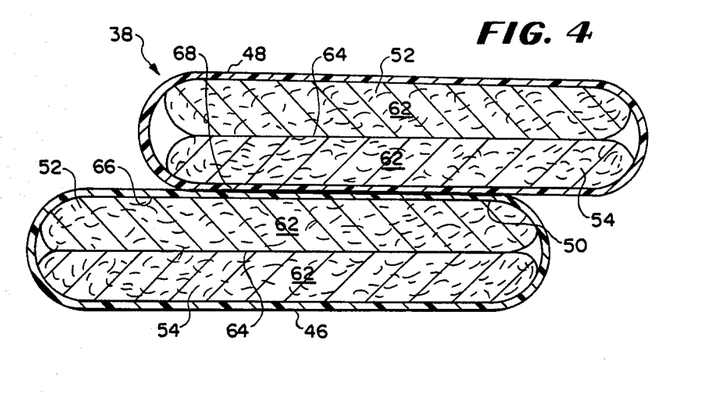
FIG. 4 is a top sectional view of one pad of the shielding system.

Referring to FIG. 4, the covers or sleeves 46 and 48 of one pad 38 are best illustrated, each with a pair of blankets 52 and 54 inserted therein. Each of the blankets has a lead core interior 62 formed from the stitched lead wool. Each pair of blankets 52 and 54 are secured to one another such as by glueing along a common seam 64 prior to insertion into the covers 46 and 48. Each pair of blankets 52 and 54 is then glued to a sleeve wall 66 and 68, respectively, adjacent to the seam 50 to provide a very strong but flexible pad 38. The outer covers 46 and 48 can be made from nylon or reinforced polyvinyl chloride (PVC) or other suitable material preferably having a tear strength of at least 300 pounds since the total weight of each pad 38 may be on the order of 300 to 350 pounds. The shorter pads 38' weigh less than the pads 38.

Figure 5:
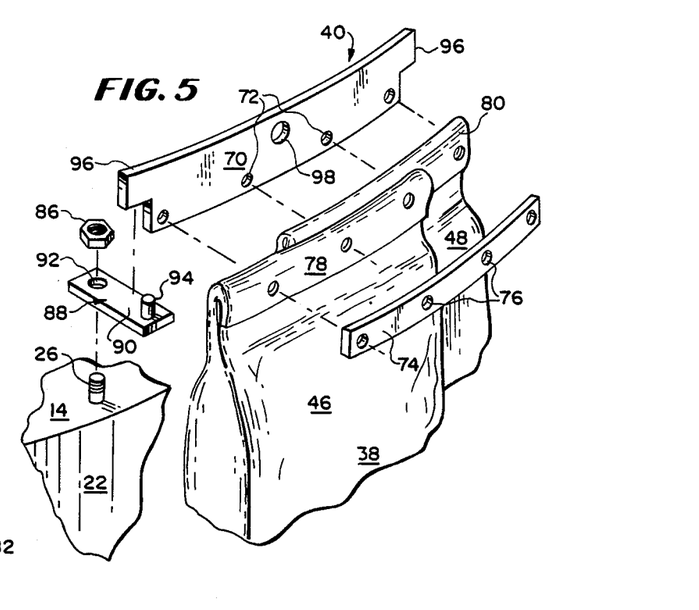
FIG. 5 is an exploded perspective view of one hanging plate of the shielding system of the parent application.
Figure 6:
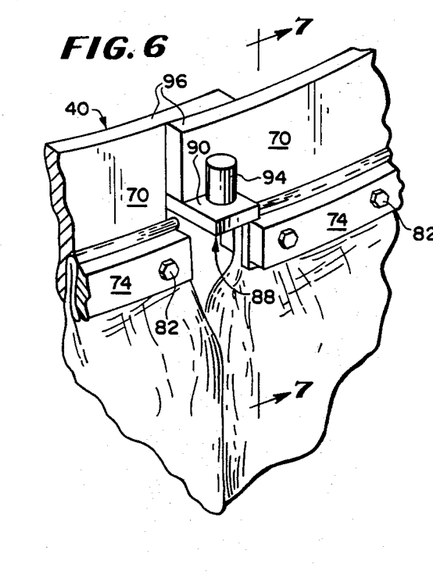
FIG. 6 is a partial perspective view of the hanging plate of FIG. 5 mounted on the reactor head.
Figure 7:
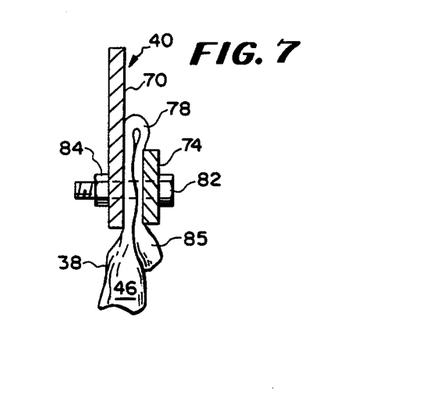
FIG. 7 is a partial side section view of the hanging plate of FIG. 6 taken along the line 7—7 therein.

The assembly of the hanging plates 40 employed in the system of the parent application for the pads 38 and 38' is best illustrated in FIGS. 5 through 7. The plates 40 include a large innerplate 70 with a plurality of bolt holes 72 therethrough. A mating outer plate 74 has a plurality of bolt holes 76 which match with the holes 72 in the inner-plate 70. Each of the covers 46 and 48 has a top portion 78 and 80, respectively, folded over upon itself above the tops of the inner blankets 52 and 54 to provide a secure mounting pad for the plates 70 and 74. The top portion 78 and 80 are sandwiched between the plates 70 and 74 utilizing a plurality of bolts 82 and nuts 84. As best seen in FIG. 7 the sandwiched portion 78 has an outer end 85 which flares out further ensuring the secure mounting of the pads 38.

The bolts or studs 26 on the reactor top 14 include a nut 86 which are removed to secure a mounting arm 88 thereon. The arm 88 includes a plate 90 and a stud hole or aperture 92 which is mounted on the stud 26 and secured by the nut 86. The outer end of the mounting arm 88 includes a retaining post or pin 94.

Each of the mounting plates 40 includes a projecting mounting ear 96 at each end, which overlap one another behind the retaining post 94. The plates 40 preferably include a lifting aperture 98 into which can be placed a hook or other mechanical means to lift the pads 38 into position on the reactor head 12 or on a frame if desired. The plates 70 and 74 preferably have a shape to fit the outside of the reactor head 12.

The resulting pad assembly 38 provides a flexible shield covering which will not injure the reactor side 22 and provides a reactor head shield 10 which is easily placed around the reactor head 12 while the nuts 32 are being removed and replaced and may be left on the reactor head throughout the work outage. The pads 38' may have the chains 41 attached to their outer bolts 82 in the plate or clamp 40. The resulting shielding with the quadruple lead wool blankets saves approximately 25 to 30 man rems per outage which is a reduction in exposure factor orders of magnitude less than that otherwise required during a refueling outage.

The improvements of the present invention will now be discussed with reference to FIGS. 8–16.

Figure 8:
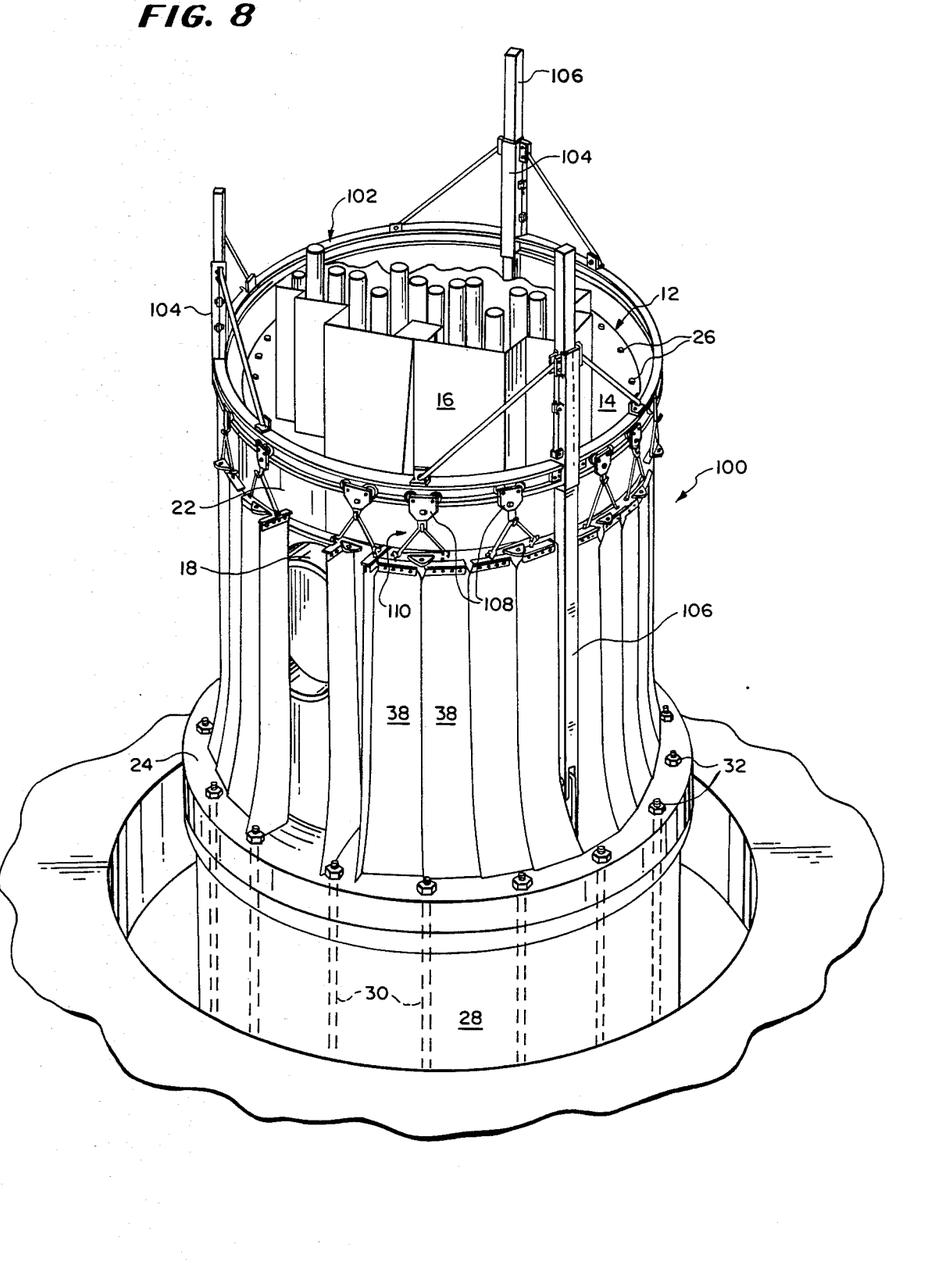
FIG. 8 is a partial perspective view of a reactor head with the improved modular reactor head shielding system of the present invention assembled thereon.

In FIG. 8, an improved modular reactor head shielding system embodying the present invention is designated generally by the reference numeral 100. The improved reactor head shielding system 100 is shown operatively in place on a reactor head 12. The reactor head and base illustrated in FIG. 8 are identical to those described with respect to FIG. 1. All common reference numerals refer to the same parts.

The improvement of the present invention resides primarily in the method and apparatus for securing the pads 38 to the reactor head 12. The method and apparatus, to be described in detail hereinafter, allows a more shielded and expeditious mounting and demounting of the pads 38 as well as greatly improved ease of access to and protection while working on any particular part of the reactor head 12.

The improved system 100 includes a circular track 102, track mounting assembly 104, trolleys 108, hanging assembly 110, as well as the flexible pads 38.

In one embodiment, the circular track 102 is made of three sections of 5" structural I beam. The track is mounted with three track mounting assemblies 104 to vertical reactor head lifting members 106. Preferably, a circumferential arrangement of the track 102 and the pads 38 having a greater diameter than the outer extension of the vent ports 18 is employed. Thus, the pads 38 now hang outside the vent ports 18, shielding the ports 18 entirely and negating the necessity for the short pads 38' and also negating the necessity for any sort of custom shaped shield to go over the vent ports 18. This further decreases radiation exposure during the mounting and removal of the pads 38.

Figure 9:
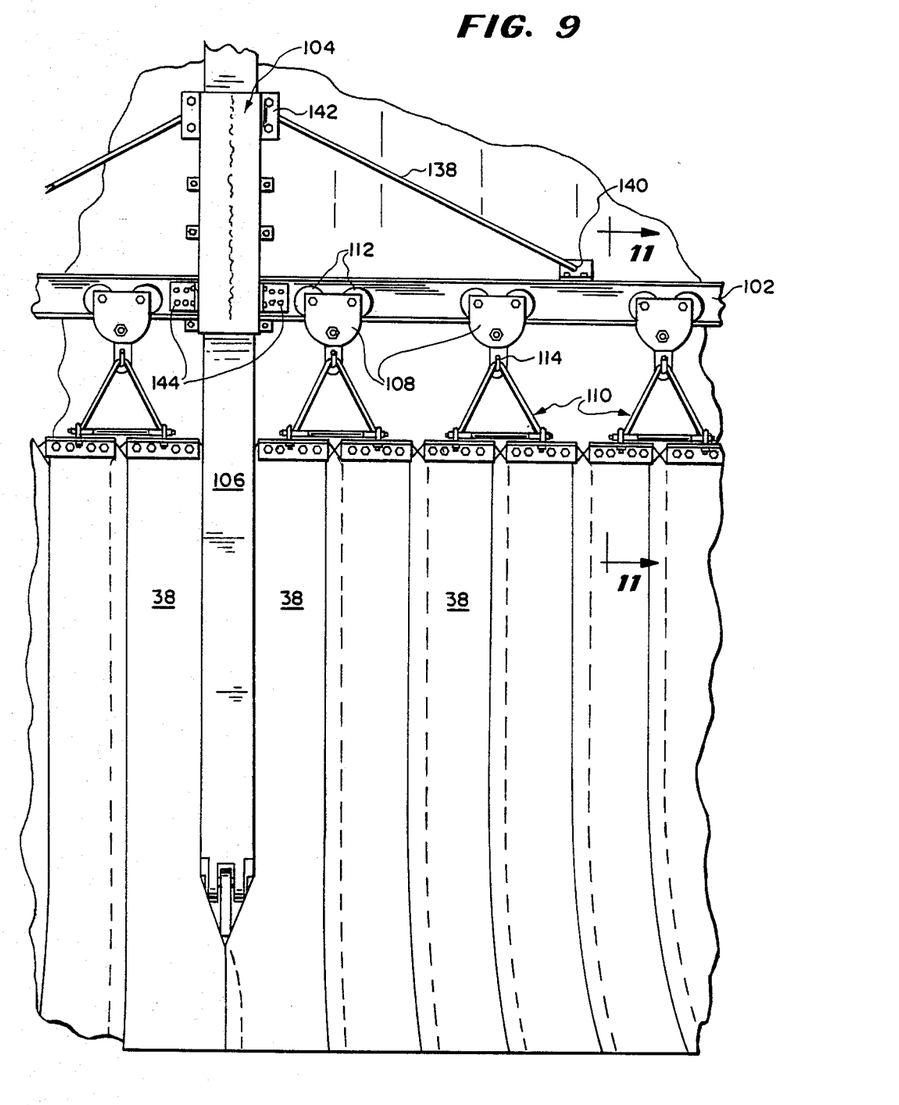
FIG. 9 is a partial view of the pads and one preferred embodiment of the hanging assemblies of the present invention mounted on the track.
Figure 10:
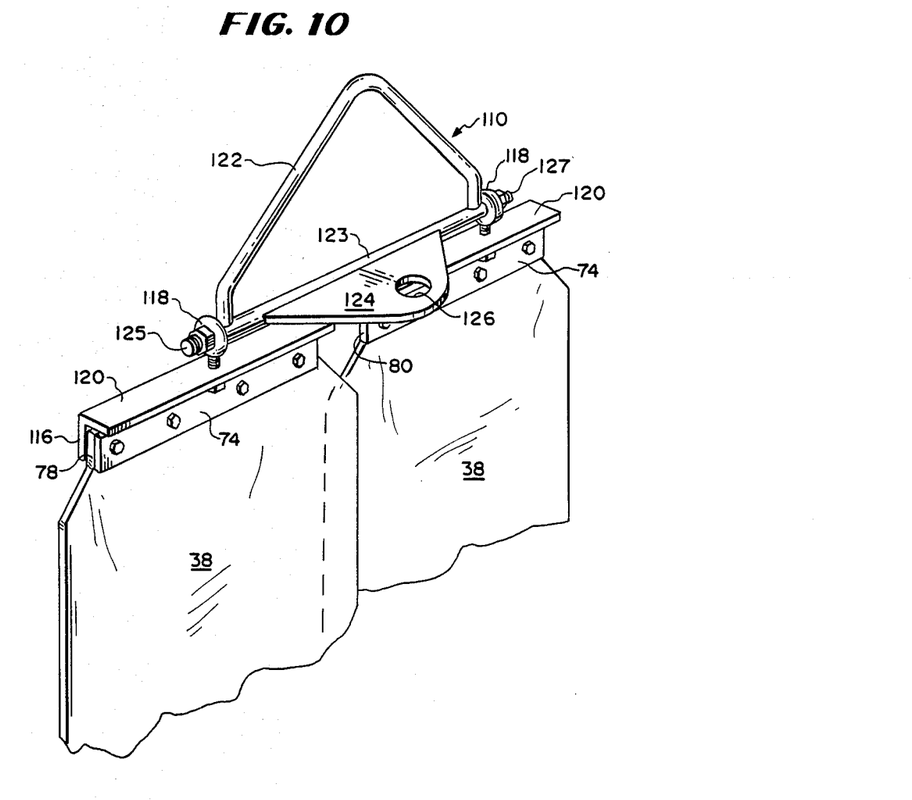
FIG. 10 is a partial perspective view of a pair of pads assembled with all hardware for hoisting and mounting.
Figures 11, 12:
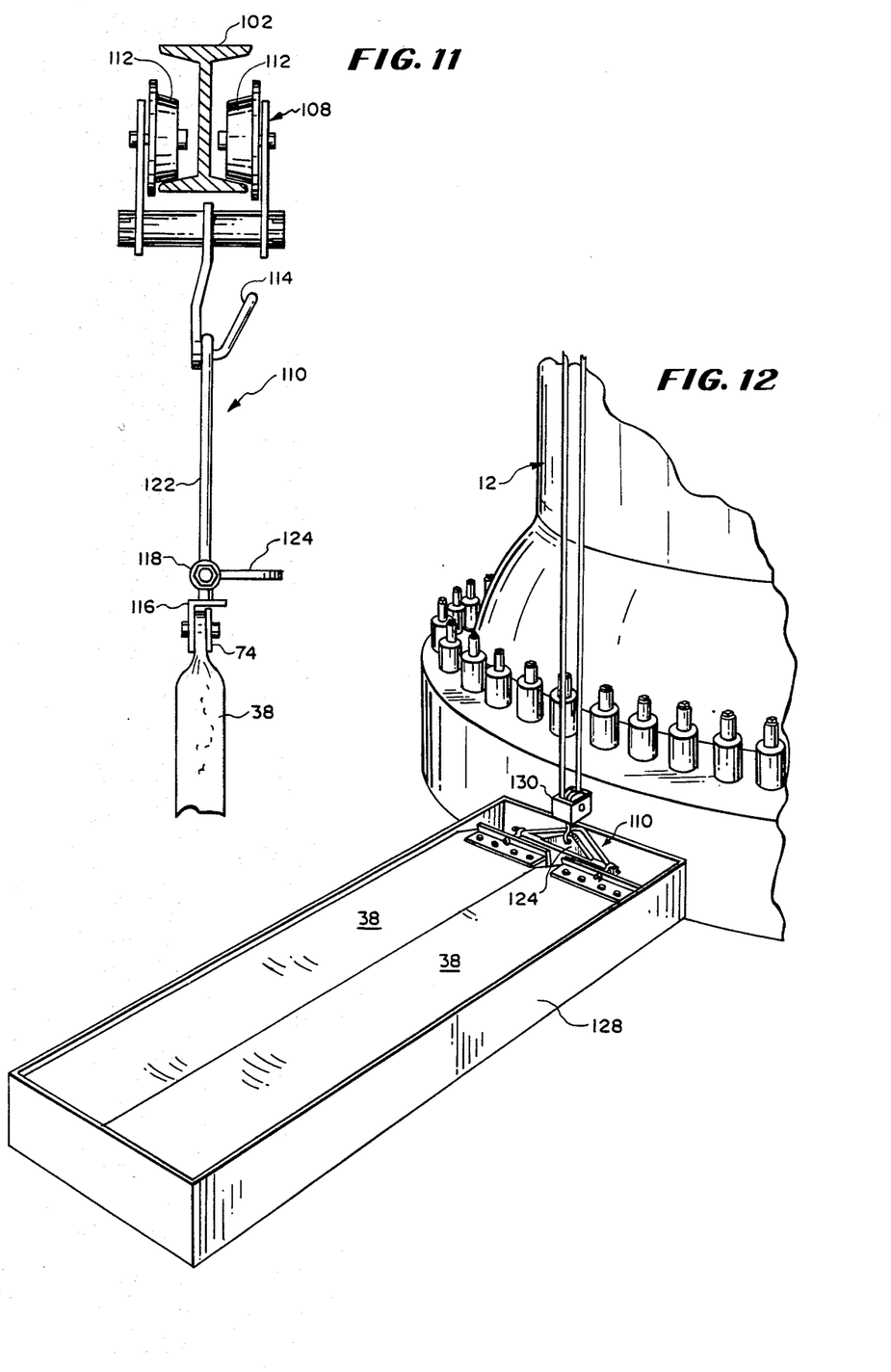
FIG. 11 is a partial side sectional view of the mounted hanging assembly of FIG. 9 taken along line 11—11 therein.
FIG. 12 is a partial perspective view of the flexible pads in their storage container ready to be hoisted for mounting.

Referring now more particularly to FIGS. 9, 10 and 11, the trolleys 108 and hanging assemblies 110 are shown. FIG. 11 is a cross sectional view, along line 11—11 of FIG. 9, of an embodiment of the invention wherein an I-beam track 102 has a trolley 108 mounted thereon and a hanging assembly 110 is attached to a pad 38 and is demountably securing the pad 38 to the trolley 108.

FIGS. 9 and 11 show the use of a trolley 108 having four wheels 112, two on each side. Such an arrangement has great mechanical strength and allows the pads 38 to be slid to either side to allow easy and immediate access to any given point on the reactor head 12. It should be understood that any suitable means, motorized or mechanical, for securing the pads to the track 104 and which allows for easy sliding in either direction would be within the spirit of the present improved invention. Each trolley 108 also has a hook-like member 114 protruding downward from which the hanging assembly 110 is suspended.

The preferred embodiment of the hanging assembly 110 will now be discussed with reference primarily to FIG. 10. As can be seen, the embodiment includes an arrangement for connecting the pads 38 to the hanging assembly 110 in some respects similar to that described above and shown in FIGS. 5-7, particularly FIG. 7. There is employed for each pad 38 an inner plate 116, which is L-shaped in cross section, and an outer plate 74 similar to that shown in FIGS. 5-7, each of which having mating bolt holes. The two plates are bolted together through the top portions 78 and 80 of the pads 38 in a similar manner as described with respect to FIGS. 5-7 above.

To facilitate the mounting of the improved system 100 an eye bolt 118 is attached to or through an end portion 120 of the inner plate 116. A triangular shaped member 122 has a base element 123, which is attached by the ends 125 and 127 to the eye bolts 118. The triangular member 122 has a solid triangular section 124 secured to or contiguous with its base element 123 that extends at an angle to the plane of the triangular member 122. The section 124 contains a hole 126 or other means for engagement with a hook or other mechanical means for lifting the pads 38 into position on the trolleys 108. The eye bolts 118, also allow each pad 38 to be pivoted on its longitudinal axis for additional ease of access to the reactor head 12.

Figure 13:
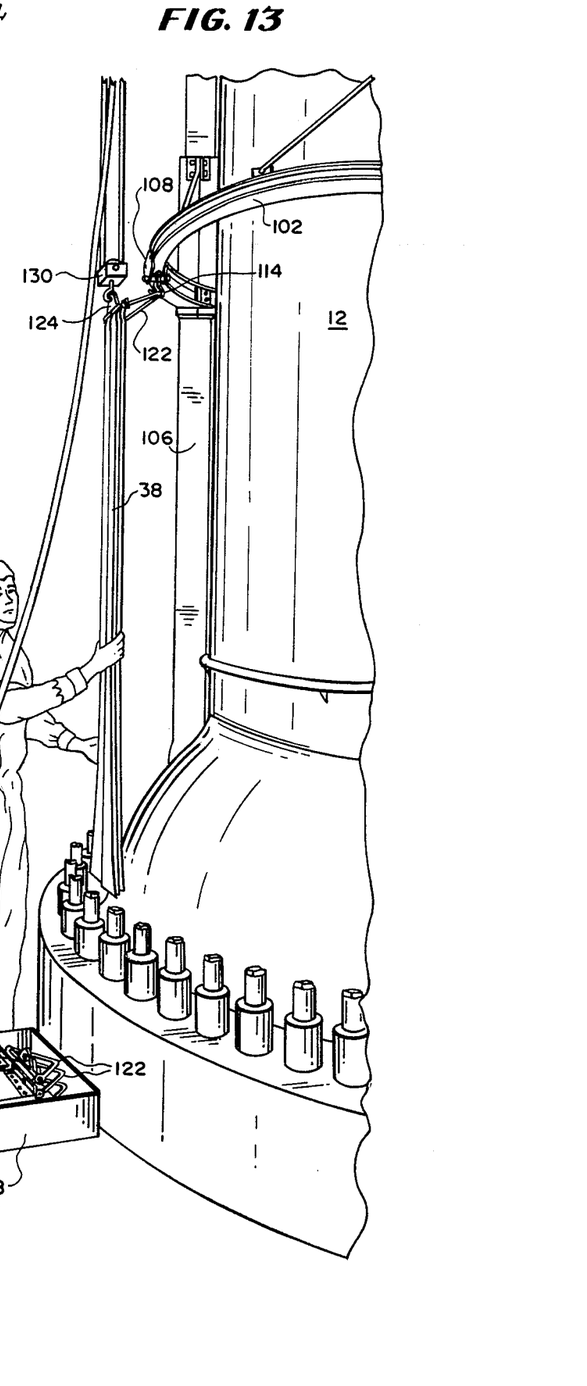
FIG. 13 is a partial perspective view illustrating the process of mounting the pads on the track.

FIGS. 12 and 13 illustrate the ease with which the pads 38 can be mounted and demounted on the trolleys 108.

It is contemplated that a suitably dimensioned storage container 128 as shown in FIGS. 12 and 13, would be supplied with the improved system 100. Each container 128 would hold a number of pairs of pads 38 with hanging assemblies 110, and allow installation directly from the containers 128 to the hook 114 on the trolleys 108.

As best illustrated in FIG. 13, a hoist 130, such as a standard stud detention hoist, is hooked through hole 126 in section 124 to lift a pair of pads 38 from the container 128 to the hook 114. Hook 114 is then inserted through the triangular member 122. Hoist 130 is then lowered until it disengages from hole 126 whereupon installation of that pair of pads 38 is completed. Note that the angle between section 124 and triangular member 122 allows a substantial simplification of the installation and removal processes. First, because of the angle between the section 124 and triangular member 122, section 124 will project up when the pads 38 are in the storage container. This makes insertion of hoist 130 through hole 126 for removal of pads 38 very simple. The angle also facilitates the engagement of triangular member 122 with hook 114 when the pads 38 are lifted by hoist 130. Finally, this angle, in conjunction with the weight of the pads 38, will cause the pads 38 being installed to automatically disengage from and swing free of hoist 130 as it is lowered after engaging triangular member 122 and hook 114. Furthermore, the worker guiding the pads 38 to the trolley 108 would have a set of pads 38 between him or her and the reactor head 12 during virtually the entire installation process.

System 100 allows comparatively effortless installation and removal by only two workers. Moreover, one of them can be removed from close proximity to the reactor head while the other is shielded so that during installation or removal he is exposed to quantities of radiation that are orders of magnitude less than the exposure attendant with prior art systems.

Referring now more particularly to FIGS. 14-17, there are shown different embodiments for mounting the frame 102 to the reactor head 12 without modifying the reactor head 12. In two of the preferred embodiments, the track mounting assemblies 104 can be secured to the lifting members 106 entirely by friction (i.e. clamping) and therefore absolutely no drilling, welding or disassembly of any part of the reactor head 12 is required. The advantages of such systems are many. Among them are the ease with which the system can be installed and the lack of further complication of crucial seismic and other considerations in the design of the reactor head 12 as well as any attendent permits required thereby. Further, the support components of the improved system 100, primarily the track 102 and mounting assemblies 104, can be left in place indefinitely to further facilitate subsequent removal and reinstallation of the pads 38 or removed entirely.

The first embodiment 131 of the track mounting assembly 104 will now be discussed with reference to FIG. 14. This embodiment includes a sleeve 132 which is halved longitudinally, bolts 134, pressure maintaining brackets 136, support members 138, distal fixtures for support members 140 (shown in FIG. 9), clamping brackets 142 and track bolting plates 144. The pressure maintaining brackets 136 are mounted (e.g. by welding) on either side of each half of the sleeve 132. The halves of the sleeve 132 are aligned around a lifting member 106 at an appropriate height and each pair of corresponding pressure maintaining brackets 136 are tightened together with bolts 134 to maintain friction with the lifting member 106. The clamping brackets 142 are connected to a support member 138, for instance steel rod or cable, which is attached by an appropriate fixture 140 at its distal end to the circular track 102 (shown in FIG. 9). This adds additional support along the arc of the track 102. Finally the track bolting plates 144 are mounted on either side of each half of the sleeve 132 and bolted to the track 102 for the final connection.

Figure 14:
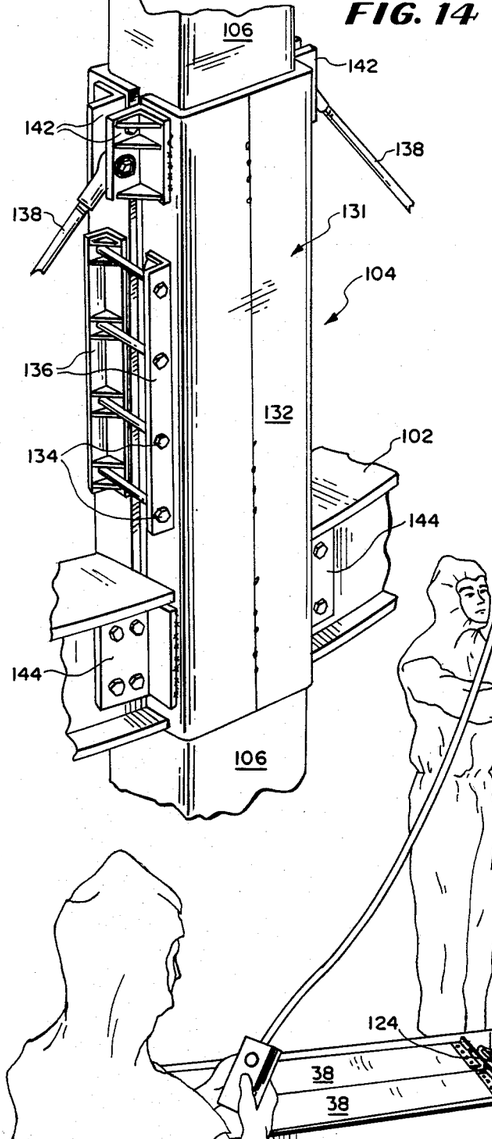
FIG. 14 is a partial perspective view of one embodiment of the track mounting assembly.
Figures 15, 16, 17:
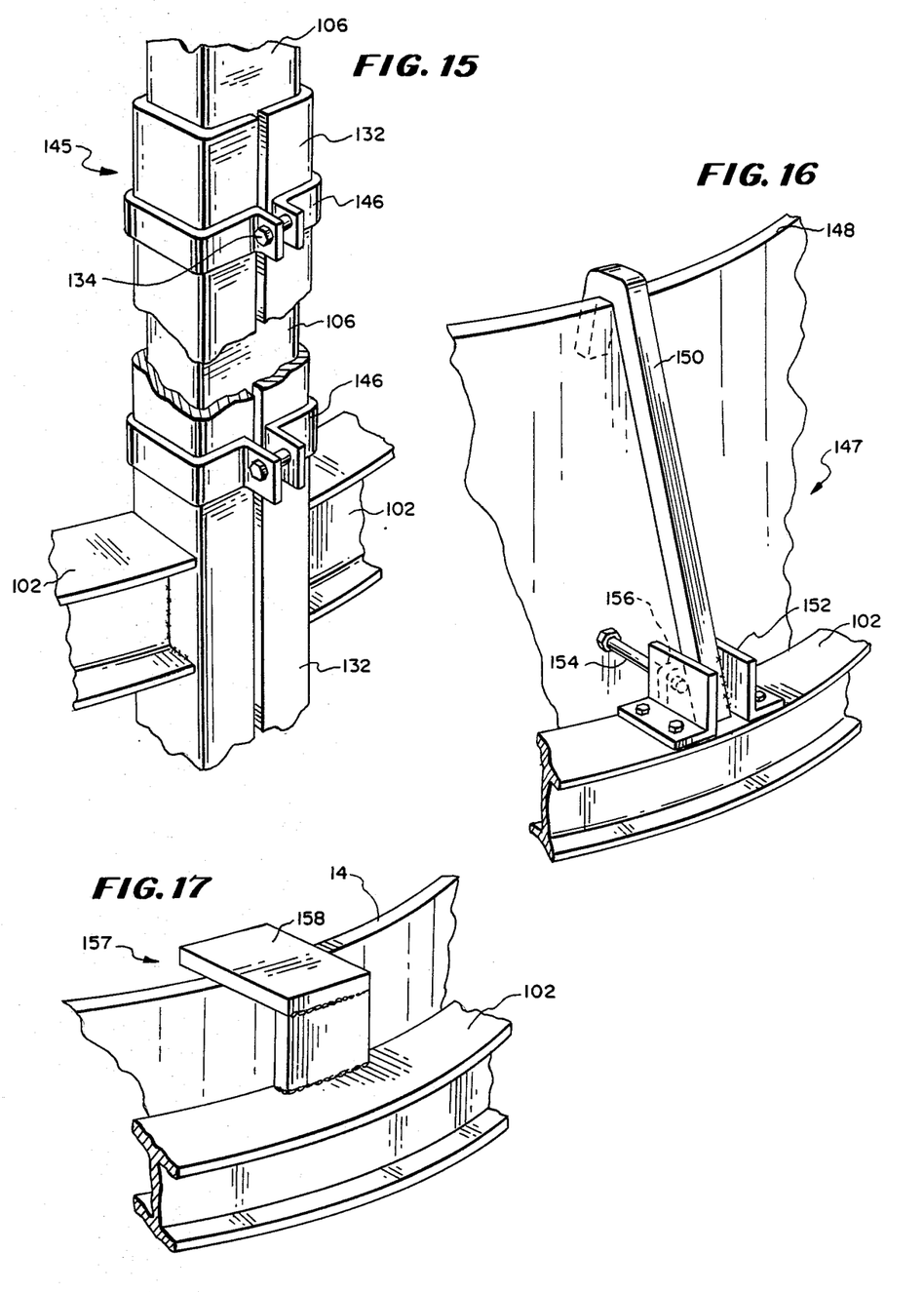
FIG. 15 is a partial perspective view of another embodiment of the track mounting assembly.
FIG. 16 is a partial perspective view of a further embodiment of the track mounting assembly.
FIG. 17 is a partial perspective view of yet another embodiment of the track mounting assembly.

In the embodiment 145 of the track mounting assembly illustrated in FIG. 15, the sleeve 132 is also halved longitudinally. However, only one half is directly secured to each section of track 102 which juxtaposes the track mounting assembly 104. Each half of sleeve 132 can be secured to a section of track 102 by the addition of brackets if desired, such as brackets 144 illustrated in FIG. 14. In other words, in the embodiment of FIG. 15, the halves of the sleeve 132 are rotated 90° from the corresponding orientation of FIG. 14 before being joined to the track sections.

In this embodiment 145, sleeve 132 can extend, around lifting member 106, all the way down to and rest on, the base of lifting member 106. The halves of the sleeve 132 are kept secure by individual pressure maintaining brackets 146 which are held together by bolts 134.

It should be noted that FIG. 15 offers an alternative that eliminates support member 138 and therefore also eliminates distal fixtures 140 and clamping brackets 142.

The configuration of FIG. 15 can also be adapted to be a purely friction support system as in FIG. 14. Clamps 146 would be relied upon for support rather than extending sleeve 132 all the way to the base of lifting member 106. In such a case, support members 138 and their attendant hardware could be added if desired. It should be clear that any suitable method of maintaining the friction between the mounting assembly 104 and the lifting members 106 can be employed within the spirit of the present invention.

The above discussion should make it evident that another factor in the substantial simplification of installation of the improved system 100 is the elimination of mounting arm 88 and therefore the elimination of the necessity for removal of nut 86 as discussed with respect to the parent application and FIGS. 5 and 6.

Referring now more particularly to FIG. 16, there is illustrated an embodiment 147 of a track mounting assembly 104 which avoids the use of friction while retaining the ease of installation found throughout the improved system 100. This embodiment also avoids any mechanical or structural alteration of the reactor head 12.

This embodiment 147 is for use with reactor heads 12 having a flange 148 around the top 14. An inverted hook-shaped member 150 is hung over the flange 148 and attached to L-brackets 152. The brackets 152 are bolted, or otherwise attached, to the circular track 102. Also employed is a spacing member 154 for maintaining the orientation of track 102 to the reactor head 12. The spacing member 154 can be in direct contact with the circular track 102 or the hook-shaped member 150 of connected by a suitable bracket 156. It should be noted that spacing member 154 is not bolted to, threaded through a drilled hole, or in any way permanently attached to the reactor head 12.

Referring now more particularly to FIG. 17, there is illustrated another embodiment 157 of the present invention particularly applicable when the top 14 of the reactor head 12 is flat but which may also be used with the flanged head 12 discussed with respect to FIG. 16. An "L" or "Z" shaped support piece 158 is used to rest over the top 14 of the reactor head 12. The I-beam track 102 is secured to the support piece 158. The track 102 could be secured by welding, mechanical attachments or the entire configuration could be cast in one piece. Notwithstanding the particular method used to join the track 102 to the support piece 158, this embodiment also maintains a preferable feature of the present invention. That is that the reactor head 12 need not be drilled, welded or dissassembled.

It should be noted that the use of a prior art system on a reactor head 12 with a flanged top would be far more difficult than with the present invention.

Many modifications and variations of the present invention are possible in light of the above teachings. The circular frame 102 could be permanently mounted on or around the reactor head 12 if it proved cost effective and permissable. The track 102 could be rectangular in shape. It could also be in two or more sections if desired or required by the design of a particular reactor head 12. The particular configuration might be other than structural I-beam with trolleys 108 thereon as long as the system 100 allows ease of movement of the pads 38 along the frame 102. The scale and shape of each reactor head 12 of different manufacturers or different models would be somewhat different, however, the shaping of the pads 38 is easily accomplished within the teachings of the invention. The pads 38 preferably are tapered to fit the curvature of the reactor head 12, but also could be straight with some filler pads in between. The pads 38 may also be secured to one another by straps 42 such as is shown in and described with respect to FIG. 1. It is, therefore, to be understood that within the scope of the appended claims, the invention may be practiced otherwise than as specifically described.

What is claimed and desired to be secured by Letters Patent of the United States is:

1. An improved radiation source shielding system comprising:

a radiation source;

substantially elongate support means, said support means secured around at least a substantial portion of the periphery of said radiation source to support said shielding system;

a plurality of flexible shielding means, said shielding means being arranged around the periphery of said source and secured to said support means for substantially reducing radiation exposure;

assembly means for removably securing said shielding means to said support means, said assembly means being adapted to allow bidirectional movement of said shielding means along said support means for quick and easy access to any point on said source;

said assembly means including means for facilitating the mounting and demounting of said flexible shielding means on said support means for substantially decreasing radiation exposure during the mounting and demounting process; and said facilitating means including hanging assemblies, each of said hanging assemblies being secured to one end of at least one of said shielding means, said hanging assemblies including a hanging member, said hanging member having a first plane and being secured to said shielding means for mounting said shielding means on said support means and a section rigidly secured to said hanging member at an angle thereto, transverse to said plane of said hanging member, said section including engagement means for facilitating lifting of said shielding means, said engagement means substantially centered and offset and extending away from said hanging member plane.

2. The shielding system of claim 1 wherein said elongate support means include a substantially circular track.

3. The shielding system of claim 1 wherein said radiation source is a nuclear reactor head.

4. The shielding system according to claim 2 wherein said circular track includes at least two arcuate sections.

5. The reactor shielding system of claim 2 wherein said track includes an I-beam type structure.

6. The shield system of claim 3 wherein said support means include means for frictionally securing said support means to said reactor head to support said shielding system without mechanical alterations of said reactor head.

7. The shielding system of claim 3 wherein said support means includes a plurality of track mounting assemblies for removably mounting said support means to said reactor head.

8. The shielding system of claim 7 wherein said reactor head has reactor head lifting members and said track mounting assemblies removably secure said support means to said reactor head lifting members on said reactor head.

9. The shielding system of claim 8 wherein said track mounting assemblies are secured to said head lifting members.

10. The shielding system of claim 9 wherein said track mounting assemblies include means for securing said track mounting assemblies to said head lifting members by friction.

11. The shielding system of claim 7 wherein said reactor head has a flanged edge and each said track mounting assembly includes a hook-shaped member for hooking over said flanged edge.

12. The shielding system of claim 7 wherein said reactor head has a substantially flat top and each said track mounting assembly includes a substantially L-shaped member for resting over said flat top.

13. The shielding system of claim 1 wherein said assembly means includes trolley means from which said shielding means are suspended for accomplishing bidirectional movement of said shielding means.

14. The shielding system of claim 1 wherein said assembly means includes means for mounting more than one of said flexible shielding means on said support means.

15. The shielding system of claim 14 wherein said assembly means includes means for mounting two of said flexible shielding means.

16. The shielding system of claim 1 wherein each of said hanging assemblies includes means for reinforcing said end of each said shielding means.

17. The shielding system of claim 16 wherein said hanging member is a triangular member for mounting said shielding means on said support means and means for securing said reinforcement means to said triangular member.

18. The reactor shielding system of claim 17 wherein said means for securing said reinforcement means to said triangular member is adapted to allow each of said shielding means to be pivoted about its longitudinal axis.

* * * * *